(12) United States Patent
Chun et al.

(10) Patent No.: US 11,386,643 B2
(45) Date of Patent: Jul. 12, 2022

(54) DRIVING CONTROLLER, DISPLAY APPARATUS INCLUDING THE SAME AND METHOD OF DRIVING DISPLAY PANEL USING THE SAME

(71) Applicant: Samsung Display Co., Ltd., Yongin-Si (KR)

(72) Inventors: Byung Ki Chun, Seoul (KR); Kuk-Hwan Ahn, Hwaseong-si (KR); Young Wook Yoo, Suwon-si (KR); Jungyu Lee, Seoul (KR); Hyunjun Lim, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/891,981

(22) Filed: Jun. 3, 2020

(65) Prior Publication Data

US 2021/0103765 A1 Apr. 8, 2021

(30) Foreign Application Priority Data

Oct. 7, 2019 (KR) ........................ 10-2019-0124067

(51) Int. Cl.
*G06V 10/75* (2022.01)
*G06F 16/535* (2019.01)
(Continued)

(52) U.S. Cl.
CPC .......... *G06V 10/758* (2022.01); *G06F 16/535* (2019.01); *G06K 9/6227* (2013.01);
(Continued)

(58) Field of Classification Search
CPC .. G06K 9/6212; G06K 9/6227; G06K 9/6202; G06K 9/325; G06K 2209/25;
(Continued)

(56) References Cited

U.S. PATENT DOCUMENTS 4,908,780 A * 3/1990 Priem ................... G09G 5/393
345/611
2014/0146071 A1* 5/2014 Kim ..................... G09G 3/3225
345/589

(Continued)

FOREIGN PATENT DOCUMENTS

KR 10-2020-0026421 A 3/2020
KR 10-2020-0030711 A 3/2020

*Primary Examiner* — Nay A Maung
*Assistant Examiner* — Daniella M. DiGuglielmo
(74) *Attorney, Agent, or Firm* — Innovation Counsel LLP (57) ABSTRACT

A driving controller includes a logo detector. The logo detector includes a histogram extractor which receives input image data and extracts a first histogram from logo area data of the input image data, a first histogram regenerator electrically connected to the histogram extractor and configured to receive the first histogram from the histogram extractor to generate a second histogram based on the first histogram and a logo map determiner electrically connected to the histogram extractor and the first histogram regenerator, and configure to select one of the first histogram and the second histogram to generate a first logo map. The driving controller is configured to compensate the logo area data of the input image data using the first logo map.

20 Claims, 9 Drawing Sheets

(51) Int. Cl.
*G06K 9/62* (2022.01)
*G06V 20/62* (2022.01)
*G09G 5/36* (2006.01)
*G09G 5/22* (2006.01)
*G09G 3/20* (2006.01)

(52) U.S. Cl.
CPC ............ *G06V 10/751* (2022.01); *G06V 20/62* (2022.01); *G09G 5/36* (2013.01); *G06V 2201/09* (2022.01); *G09G 3/20* (2013.01); *G09G 5/22* (2013.01); *G09G 2320/046* (2013.01); *G09G 2320/0666* (2013.01); *G09G 2340/04* (2013.01); *G09G 2360/16* (2013.01)

(58) Field of Classification Search
CPC .......... G06F 16/535; G09G 5/22; G09G 5/36; G09G 2340/04; G09G 2320/0666; G09G 2320/046; G09G 2360/16; G09G 3/20; G06V 10/758; G06V 10/751; G06V 2201/09; G06V 20/62
USPC ........................................................ 382/190
See application file for complete search history.

(56) References Cited

U.S. PATENT DOCUMENTS

| | | | | |
|---|---|---|---|---|
| 2015/0062197 | A1* | 3/2015 | Jung | G09G 3/2003 345/690 |
| 2018/0102099 | A1* | 4/2018 | Na | G09G 3/2003 |
| 2018/0307942 | A1* | 10/2018 | Pereira | G06K 9/6267 |
| 2020/0074596 | A1 | 3/2020 | Chun et al. | |
| 2020/0082796 | A1 | 3/2020 | Chun et al. | |

\* cited by examiner

|   |   | TP |   |   |
|---|---|-----|-----|---|
|   | 0 | 255 | 255 |   |
|   | 0 | 255 | 255 |   |
|   | 0 | 255 | 255 |   |
|   |   |     |     |   |
|   |   |     |     |   |

FIG. 4B

|   |   | TP  |   |   |
|---|---|-----|---|---|
|   |   |     |   |   |
|   |   | 170 |   |   |
|   |   |     |   |   |
|   |   |     |   |   |
|   |   |     |   |   |

DRIVING CONTROLLER, DISPLAY APPARATUS INCLUDING THE SAME AND METHOD OF DRIVING DISPLAY PANEL USING THE SAME

PRIORITY STATEMENT

This application claims priority under 35 U.S.C. § 119 to Korean Patent Application No. 10-2019-0124067, filed on Oct. 7, 2019 in the Korean Intellectual Property Office KIPO, the contents of which are herein incorporated by reference in their entireties.

BACKGROUND

1. Field

Exemplary embodiments of the present inventive concept relate to a driving controller, a display apparatus including the driving controller and a method of driving a display panel using the display apparatus. More particularly, exemplary embodiments of the present inventive concept relate to a driving controller extracting a logo map and preventing an afterimage of an area in which a logo is displayed to enhance a display quality, a display apparatus including the driving controller and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

The image displayed on the display panel may include a logo representing a broadcaster, an image producer, an image provider, or the like. The logo may be displayed at a fixed position for a long time in the image, and the logo displayed at the fixed position for a long time may generate an afterimage.

SUMMARY

Exemplary embodiments of the present inventive concept provide a driving controller extracting a logo map and preventing an afterimage of a logo portion to enhance a display quality.

Exemplary embodiments of the present inventive concept also provide a display apparatus including the driving controller.

Exemplary embodiments of the present inventive concept also provide a method of driving a display panel using the display apparatus.

In an exemplary embodiment of a driving controller according to the present inventive concept, the driving controller includes a logo detector. The logo detector includes a histogram extractor which receives input image data and is configured to extract a first histogram from logo area data of the input image data, a first histogram regenerator electrically connected to the histogram extractor and configured to receive the first histogram from the histogram extractor to generate a second histogram based on the first histogram and a logo map determiner electrically connected to the histogram extractor and the first histogram regenerator, and configure to select one of the first histogram and the second histogram to generate a first logo map. The driving controller is configured to compensate the logo area data of the input image data using the first logo map.

In an exemplary embodiment, the logo detector may further include a first binarizer electrically connected between the histogram extractor and the logo map determiner to determine a first binarization level to distinguish the first histogram into a first background area and a first logo area, and configured to count a number of pixels in the first logo area to determine a first logo pixel number.

In an exemplary embodiment, the histogram extractor may be configured to extract a white image of the input image data.

In an exemplary embodiment, when the input image data includes a component R as a first color, a component G as a second color and a component B as a third color, the histogram extractor may be configured to extract min(R, G, B). min( ) is a minimum function.

In an exemplary embodiment, the logo detector may further include a second binarizer electrically connected between the first histogram regenerator and the logo map determiner, configured to determine a second binarization level to distinguish the second histogram into a second background area and a second logo area and configured to count a number of pixels in the second logo area to determine a second logo pixel number.

In an exemplary embodiment, the first histogram regenerator may be configured to convert a value of the first background area of the first histogram into zero to generate the second histogram.

In an exemplary embodiment, the logo map determiner selects one of the first histogram and the second histogram based on the first logo pixel number and the second logo pixel number to determine the first logo map.

In an exemplary embodiment, the logo detector may further include a threshold determiner connected to the logo map determiner and configured to accumulate a logo pixel number of the first logo map to generate a threshold pixel number.

In an exemplary embodiment, the threshold determiner may be configured to accumulate the logo pixel number of the first logo map and configured to calculate an average of the accumulated logo pixel number to generate the threshold pixel number.

In an exemplary embodiment, the driving controller may further include a still image determined connected to the logo detector and determining whether or not the input image data represent a still image. The threshold determiner may be configured not to accumulate the logo pixel number of the first logo map when the input image data represent the still image.

In an exemplary embodiment, when the first logo pixel number is less than the threshold pixel number, the logo map determiner may be configured to determine the first logo map based on the first histogram. When the first logo pixel number is equal to or greater than the threshold pixel number, the logo map determiner may be configured to determine the first logo map based on the second histogram.

In an exemplary embodiment, the logo detector may further include a second histogram regenerator electrically connected to the first histogram regenerator to receive the second histogram and configured to generate a third histogram based on the second histogram of the second logo area and a third binarizer configured to determine a third binarization level to distinguish the third histogram into a third background area and a third logo area and configured to count a number of pixels in the third logo area to determine a third logo pixel number.

In an exemplary embodiment, the second histogram regenerator may be configured to convert a value of the second background area of the second histogram into zero to generate the third histogram.

In an exemplary embodiment, the logo map determiner may be configured to select one of the first histogram, the second histogram and the third histogram based on the first logo pixel number, the second logo pixel number and the third logo map pixel number to determine the first logo map.

In an exemplary embodiment, the driving controller may further include a logo map blurrer electrically connected to the logo detector to receive the first logo map and configured to blur the first logo map using an average filter to generate a second logo map.

In an exemplary embodiment, the driving controller may further include a logo map quantizer electrically connected to the logo map blurrer to receive the second logo map and configured to quantize the second logo map to generate a third logo map. A logo portion in the third logo map may be equal to or greater than a logo portion in the first logo map.

In an exemplary embodiment, the driving controller may further include an input image blurrer which receives input image data and is configured to blur the logo area data to generate blurred logo area data.

In an exemplary embodiment, the driving controller may further include a selector electrically connected to the input image blurrer and the logo map quantizer, and configured to output the logo area data when a value of the third logo map is zero and configured to output the blurred logo area data when the value of the third logo map is 1.

In an exemplary embodiment of a display apparatus according to the present inventive concept, the display apparatus includes a display panel, a driving controller and a data driver. The display panel is configured to display an image based on input image data. The driving controller includes a logo detector. The logo detector may include a histogram extractor which receives the input image data and is configured to extract a first histogram from logo area data of input image data, a first histogram regenerator electrically connected to the histogram extractor and configured to receive the first histogram from the histogram extractor to generate a second histogram based on the first histogram and a logo map determiner electrically connected to the histogram extractor and the first histogram regenerator, and configure to select one of the first histogram and the second histogram to generate a first logo map. The driving controller is configured to compensate the logo area data of the input image data using the first logo map to generate a data signal. The data driver is configured to convert the data signal to a data voltage and configured to output the data voltage to the display panel.

In an exemplary embodiment of a method of driving a display panel according to the present inventive concept, the method includes extracting a first histogram from logo area data of input image data, generating a second histogram based on the first histogram, selecting one of the first histogram and the second histogram to generate a first logo map, compensating the logo area data of the input image data using the first logo map, generating a data signal based on the input image data having the compensated logo area data, converting the data signal to a data voltage and outputting the data voltage to the display panel.

According to the driving controller, the display apparatus and the method of driving the display panel, the first binarization level and the first logo pixel number may be determined based on the first histogram of the logo area, the second binarization level and the second logo pixel number may be determined based on the second histogram generated based on the first binarization level so that the accuracy of determination of the logo map may be enhanced.

In addition, the logo area is compensated using the logo map so that the display quality of the display panel may be enhanced.

BRIEF DESCRIPTION OF THE DRAWINGS

The above and other features and advantages of the present inventive concept will become more apparent by describing in detailed exemplary embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
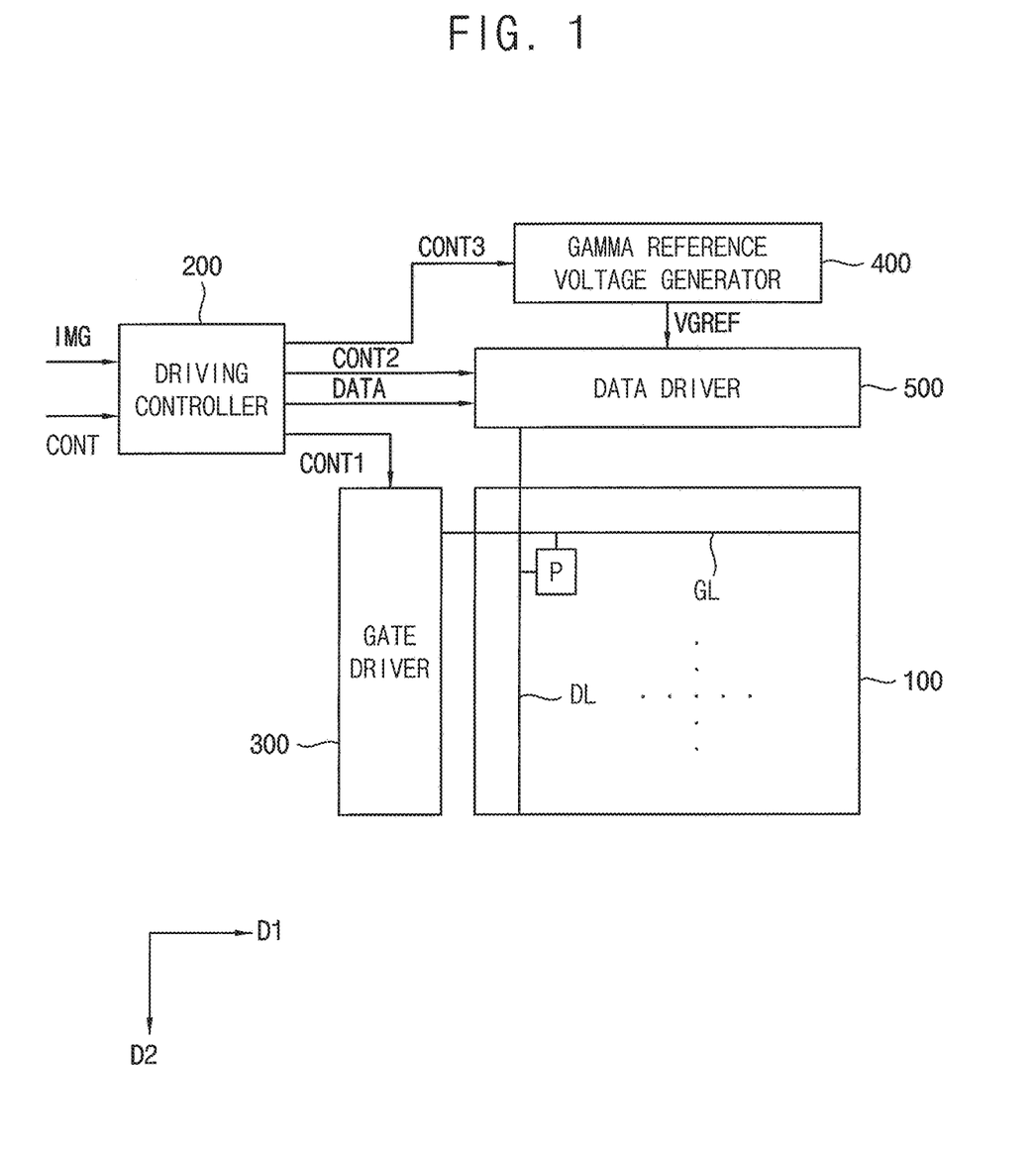
FIG. 1 is a block diagram illustrating a display apparatus according to an exemplary embodiment of the present inventive concept.

FIG. 1 is a block diagram illustrating a display apparatus according to an exemplary embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

The driving controller 200 and the data driver 500 may be integrated in one integrated circuit chip (IC chip). The driving controller 200, the gamma reference voltage generator 400 and the data driver 500 may be integrated in one IC chip. A driving module including at least the driving controller 200 and the data driver 500 which are integrated in one IC chip may a timing controller embedded data driver (TED).

The display panel 100 has a display region on which an image is displayed and a peripheral region adjacent to the display region.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus, for example, from a graphic controller or an application processor. The input image data IMG may include red image data, green image data and blue image data. The input image data IMG may further include white image data. The input image data IMG may further include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA using the input image data IMG and the input control signal CONT.

The driving controller 200 generates the first control signal CONT1 for controlling an operation of the gate driver 300 in response to the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 in response to the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

For example, the driving controller 200 may adjust a frame rate of the display panel 100 based on the input image data IMG.

The driving controller 200 generates the third control signal CONT3 for controlling an operation of the gamma reference voltage generator 400 in response to the input control signal CONT, and outputs the third control signal CONT3 to the gamma reference voltage generator 400.

A structure and an operation of the driving controller 200 are explained referring to FIGS. 2 to 8C in detail.

The gate driver 300 generates gate signals to drive the gate lines GL in response to the first control signal CONT1 received from the driving controller 200. The gate driver 300 outputs the gate signals to the gate lines GL. For example, the gate driver 300 may sequentially output the gate signals to the gate lines GL. The gate driver 300 may be mounted on the peripheral region of the display panel 100 in the form of IC chip. The gate driver 300 may be integrated on the peripheral region of the display panel 100 using the same process as the pixel forming process.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an exemplary embodiment, the gamma reference voltage generator 400 may be integrated in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
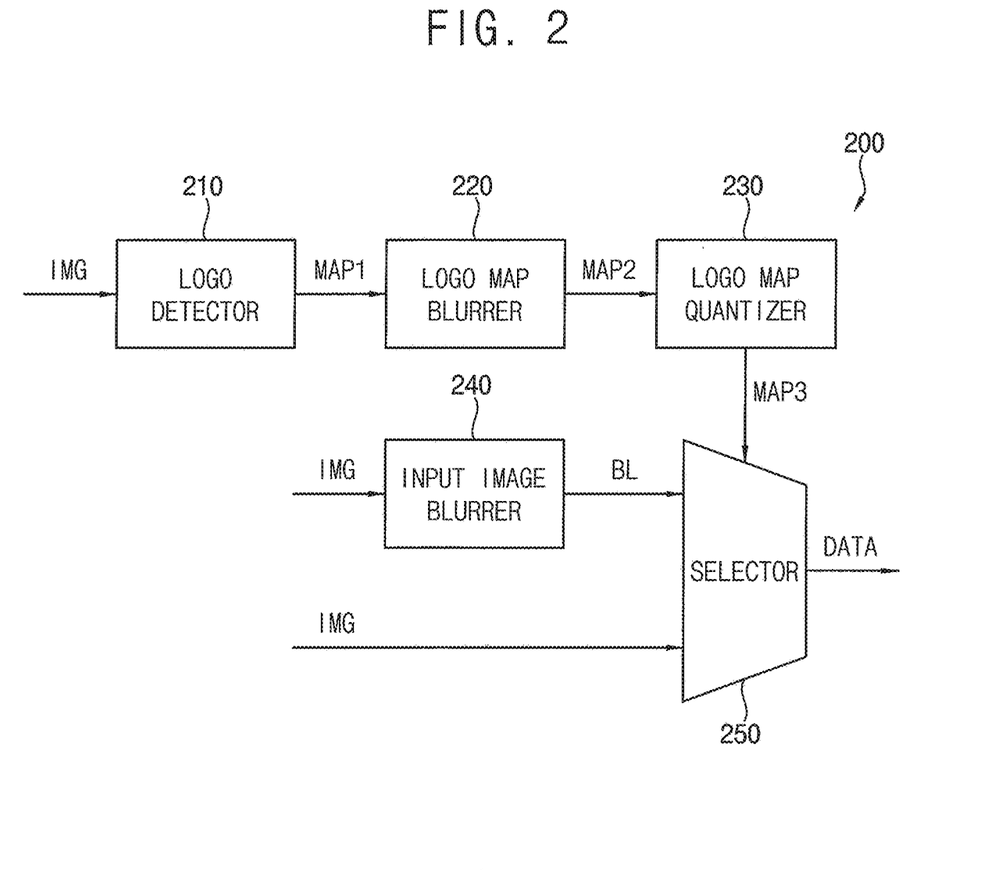
FIG. 2 is a block diagram illustrating a driving controller of FIG. 1.
Figure 3:
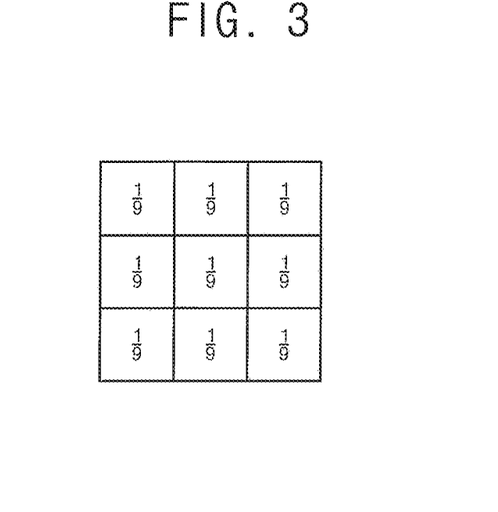
FIG. 3 is a conceptual diagram illustrating an average filter used in a logo map blurrer of FIG. 2.
Figure 4A:
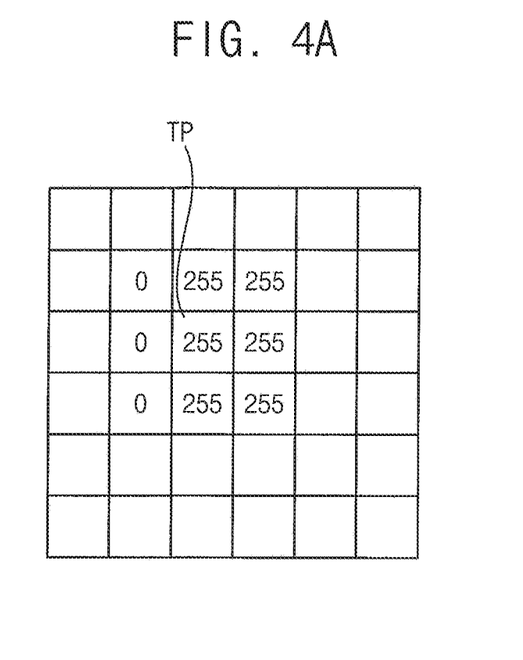
FIG. 4A is a conceptual diagram illustrating a first logo map prior to an operation of the logo map blurrer of FIG. 2.
Figure 4B:
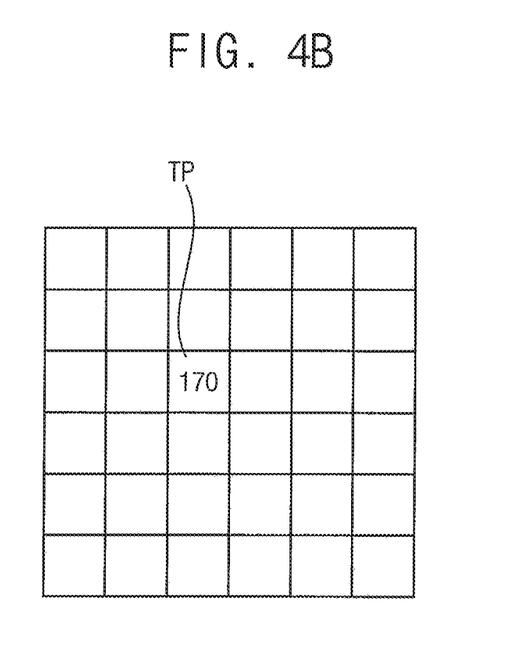
FIG. 4B is a conceptual diagram illustrating a second logo map after the operation of the logo map blurrer of FIG. 2.
Figure 5A:
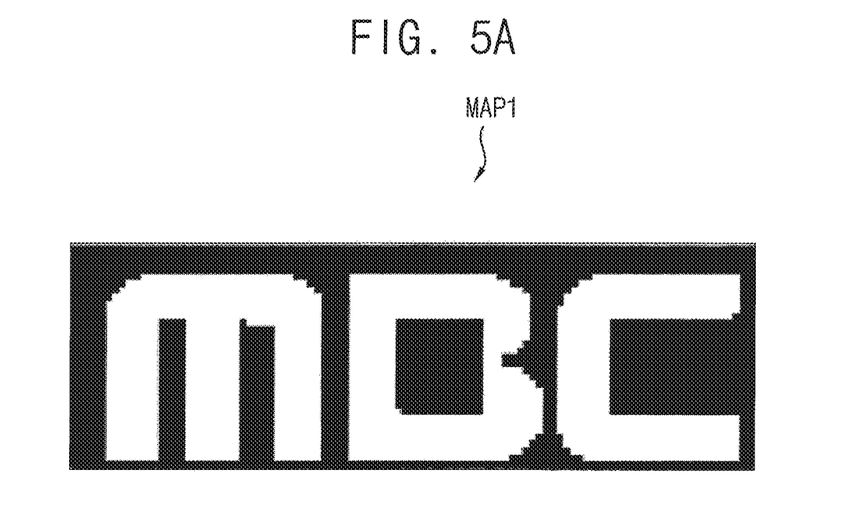
FIG. 5A illustrates an example of the first logo map prior to the operation of the logo map blurrer of FIG. 2.
Figure 5B:
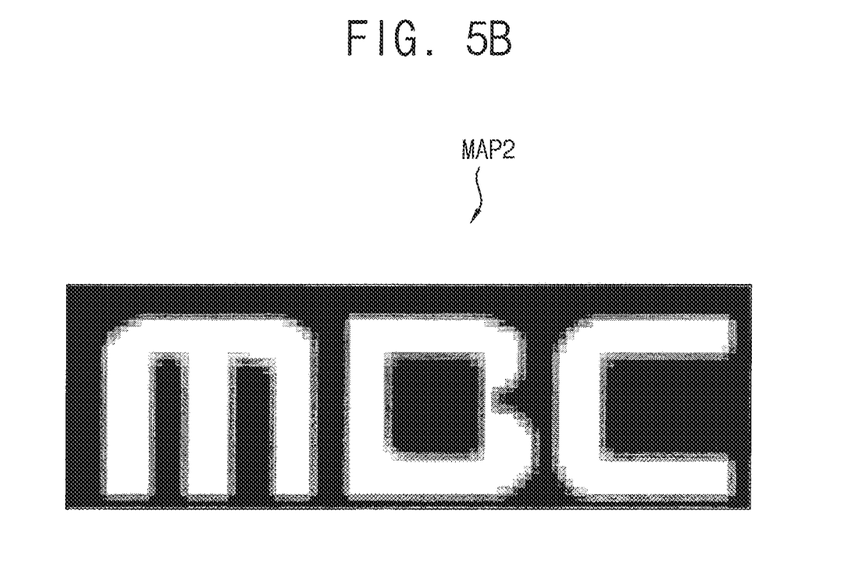
FIG. 5B illustrates an example of the second logo map after the operation of the logo map blurrer of FIG. 2.
Figure 6:
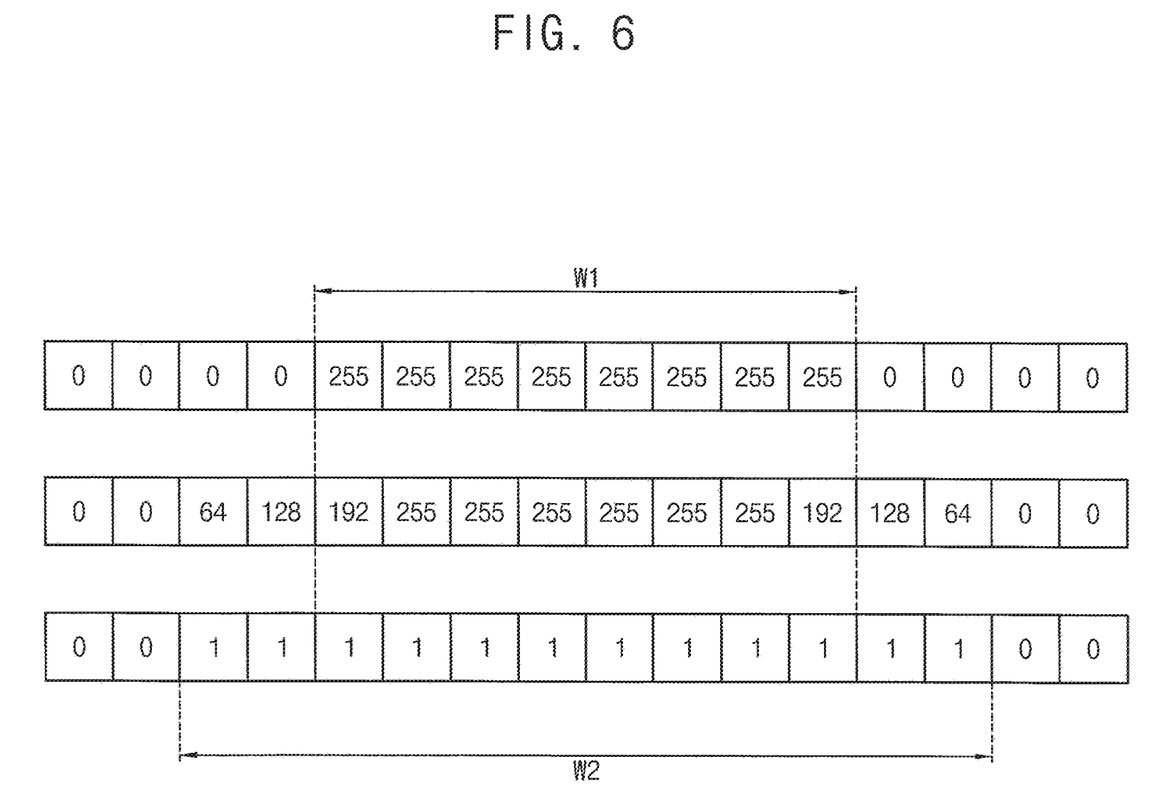
FIG. 6 is a conceptual diagram illustrating an operation of a logo map quantizer of FIG. 2.

FIG. 2 is a block diagram illustrating the driving controller 200 of FIG. 1. FIG. 3 is a conceptual diagram illustrating an average filter used in a logo map blurrer 220 of FIG. 2. FIG. 4A is a conceptual diagram illustrating a first logo map prior to an operation of the logo map blurrer 220 of FIG. 2. FIG. 4B is a conceptual diagram illustrating a second logo map after the operation of the logo map blurrer 220 of FIG. 2. FIG. 5A illustrates an example of the first logo map prior to the operation of the logo map blurrer 220 of FIG. 2. FIG. 5B illustrates an example of the second logo map after the operation of the logo map blurrer 220 of FIG. 2. FIG. 6 is a conceptual diagram illustrating an operation of a logo map quantizer 230 of FIG. 2.

Referring to FIGS. 1 to 6, the input image data IMG provided to the driving controller 200 may include a logo representing a broadcaster, an image producer and an image provider. The logo may be displayed at a fixed position for a long time in the image, and the logo displayed at the fixed position for a long time may generate an afterimage. When the display panel 100 is an organic light emitting display panel 100 including an organic light emitting element, a deterioration of the image at the fixed position for displaying the logo in the display panel 100 due to after image may be occurred.

The driving controller 200 may detect logo area data in the input image data IMG corresponding to the logo and compensate the logo area data.

For example, the driving controller 200 may include a logo detector 210, a logo map blurrer 220, a logo map quantizer 230, an input image blurrer 240 and a selector 250.

The logo detector 210 may determine a logo area which represents locations of the logo in the input image data IMG. In addition, the logo detector 210 may generate a first logo map MAP1 which includes information about the locations of the logo and locations of a background in the logo area. For example, the first logo map MAP1 may be generated only for the logo area which is a part of the input image data IMG.

For example, the logo detector 210 may obtain the logo area using an artificial intelligence (AI) technique. For example, the logo detector 210 may obtain the logo area using a machine learning method. When various logo images are trained to the logo detector 210, an AI module of the logo detector 210 may obtain the logo area using the trained logo images.

The logo detector 210 may distinguish a background area and the logo area through a plurality of binarizations. The logo detector 210 may extract a first histogram from the logo area data, generate a second histogram based on the first histogram and generate the first logo map MAP1 by selecting one of the first histogram and the second histogram.

Figure 7:
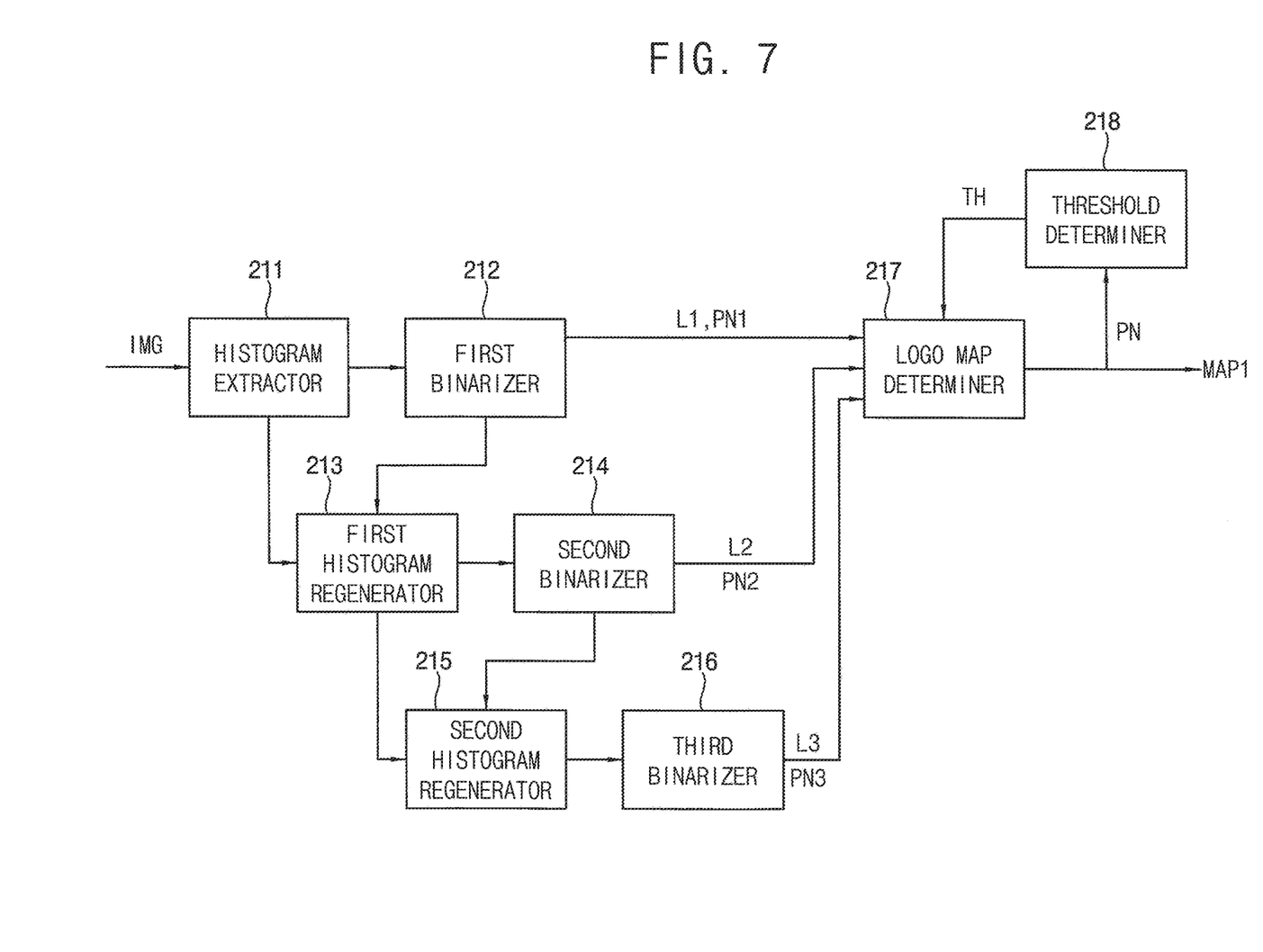
FIG. 7 is a block diagram illustrating a logo detector of FIG. 2.
Figure 8A:
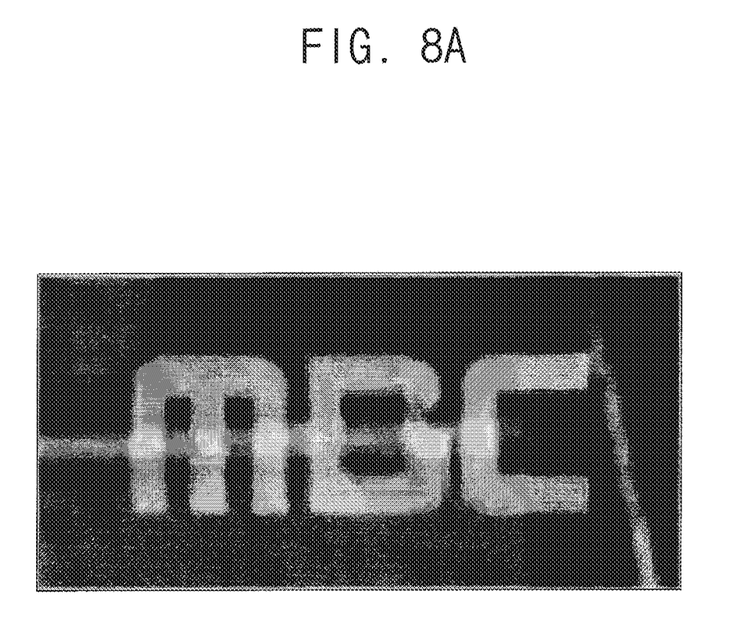
FIG. 8A illustrates an example of a logo image of input image data input to the driving controller of FIG. 2.
Figure 8B:
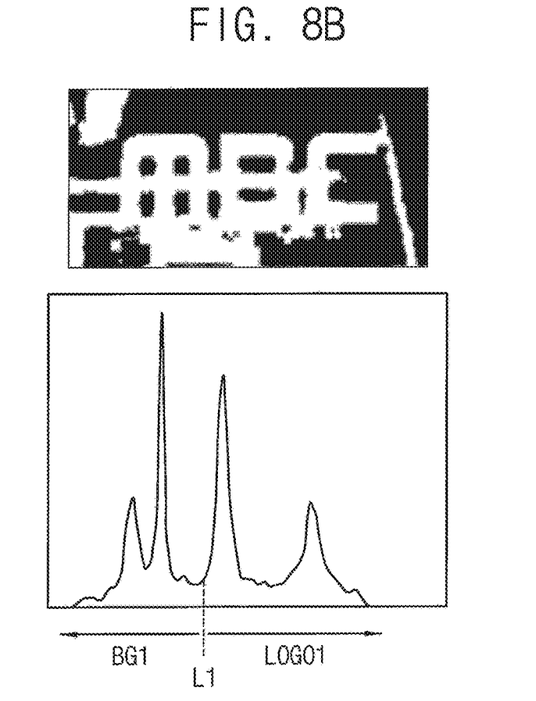
FIG. 8B illustrates a result of an operation of a first binarizer of FIG. 7.
Figure 8C:
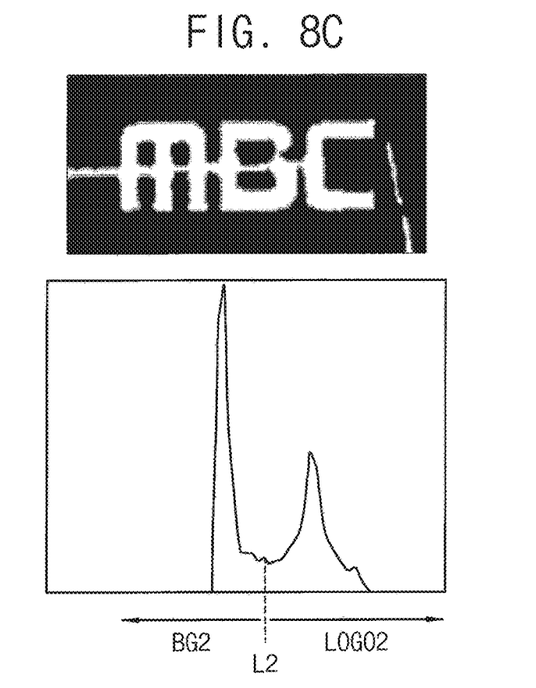
FIG. 8C illustrates a result of an operation of a second binarizer of FIG. 7.

The operation of the logo detector 210 may be explained referring to FIGS. 7 to 8C in detail.

The logo map blurrer 220 may blur the first logo map MAP1 using an average filter to generate a second logo map MAP2. For example, the first logo map MAP1 may have a value of 1 for the logo area corresponding to the logo and a value of 0 for the background area except for the logo area.

The logo map blurrer 220 may multiply 255 to the logo area of the first logo map MAP1 to perform the logo map blurring.

For example, the logo map blurrer 220 may perform the logo map blurring using the average filter. FIG. 3 illustrates a three by three average filter used by the logo map blurrer 220.

FIG. 4A represents a portion of the first logo map MAP1 where 255 are multiplied. In FIG. 4A, the background area has a value of 0 and the logo area has a value of 255. In FIG. 4A, the average filter is applied to a target pixel TP. In the same way as the target pixel TP, the average filter may be applied to all of the pixels.

When the average filter is applied to the target pixel TP, an average of nine pixels including the target pixel TP and adjacent pixels of the target pixel TP is calculated. The average of the nine pixels may be (0/9+255/9+255/9+0/9+ 255/9+255/9+0/9+255/9+255/9)=170. When the logo map blurring is performed using the three by three average filter, the value of the target pixel TP may be changed from 255 to 170 as shown in FIG. 4B.

FIG. 5A represents a first logo image corresponding to the first logo map MAP1 which only has the values of 0 and 1 which correspond to grayscale values of 0 and 255, respectively. FIG. 5B represents a second logo image corresponding to the second logo map MAP2. Herein, the second logo map MAP2 may be a result of the logo map blurring of the first logo map MAP1 using the average filter. The second logo map MAP2 may have any grayscale values between 0 and 255. A boundary of an area having the grayscale value 0 and an area having the grayscale value of 255 of the first logo map MAP1 may be blurred in the second logo map MAP2.

The logo map quantizer 230 may quantize the second logo map MAP2 to generate a third logo map MAP3. Although the second logo map MAP2 may have any grayscale values between 0 and 255 as explained above, the third logo map MAP3 only has values of 0 and 1.

For example, the logo map quantizer 230 may convert the grayscale value of the second logo map MAP2 greater than a predetermined value to the value of 1 and convert the grayscale value of the second logo map MAP2 equal to or less than the predetermined value to the value of 0.

A first row in FIG. 6 represents a portion of the first logo map MAP1 where 255 are multiplied. A second row in FIG. 6 represents a portion of the second logo map MAP2 generated by blurring the first logo map MAP1. A third row in FIG. 6 represents a portion of the third logo map MAP3 generated by converting the grayscale values in the second logo map MAP2 into the values of 0 and 1.

For example, the logo map quantizer 230 converts the grayscale values greater than 64 into the value of 1 in FIG. 6. A width of a logo portion is represented to W1 in the first logo map MAP1 and a width of a logo portion is represented to W2 in the third logo map MAP1. By the logo map blurring of the logo map blurrer 220, the boundary between the logo area and the background area in the first logo map MAP1 is blurred. When the second logo map MAP2 is quantized by the logo map quantizer 230, the width of the logo portion increases from W1 to W2. For example, the width W2 of the logo portion in the third logo map MAP3 may be equal to or greater than the width W1 of the logo portion in the first logo map MAP1. Not in the width direction, but in all directions, the logo portion in the third logo map MAP3 may be equal to or greater than the logo portion in the first logo map MAP1.

The input image blurrer 240 may blur the logo area data which are a portion of the input image data IMG to generate the blurred logo area data BL. The input image blurrer 240 may operate similar to operation of the logo map blurrer 220. The logo map blurrer 220 may blur the first logo map MAP1 which only has the values 0 or 255. However, the input image blurrer 240 may blur the logo area data which are a portion of the input image data IMG and have various grayscale values between 0 and 255.

The input image blurrer 240 blurs the logo area data which is a portion of the input image data IMG to haze a boundary between the logo area and the background area in the logo area data so that an afterimage generated due to the clear boundary between the logo area and the background area may be prevented.

When the value of the third logo map MAP3 is 0, the selector 250 may output the logo image data (a portion of the input image data IMG) without blurring. When the value of the third logo map MAP3 is 1, the selector 250 may output the blurred logo area data BL.

In the present exemplary embodiment, the driving controller 200 generates the data signal DATA based on the blurred logo area data BL for the logo area corresponding to the logo and generates the data signal based on the logo area data (a portion of the input image data IMG) which are not blurred for the background area. The driving controller 200 outputs the data signal DATA to the data driver 500. Thus, the afterimage due to the fixed location of the logo may be compensated so that the display quality of the display panel 100 may be enhanced.

When the logo detector 210 generates the first logo map MAP1, a plurality of histogram analysis may be operated in the present exemplary embodiment to enhance an accuracy of the first logo map MAP1. Hereinafter, a structure and an operation of the logo map detector 210 may be explained in detail.

FIG. 7 is a block diagram illustrating the logo detector 210 of FIG. 2. FIG. 8A illustrates an example of a logo image of the input image data IMG input to the driving controller 200 of FIG. 2. FIG. 8B illustrates a result of an operation of a first binarizer 212 of FIG. 7. FIG. 8C illustrates a result of an operation of a second binarizer 214 of FIG. 7.

Referring to FIGS. 1 to 8C, the logo detector 210 may include a histogram extractor 211 and a first binarizer 212. The histogram extractor 211 may extract the first histogram of the input image data IMG. The first histogram of the input image data IMG may mean a luminance histogram of the input image data IMG. The first binarizer 212 may determine a first binarization level L1 to distinguish the first histogram into a first background area BG1 and a first logo area LOGO1. Herein, the first logo area LOGO1 may be an area including the logo. The first background area BG1 may be an area not including the logo. The first binarizer 212 may count a number of the pixels in the first logo area LOGO1 to determine a first logo pixel number PN1.

For example, the histogram extractor 211 may extract an image corresponding to a color of the logo of the input image data IMG. Hereinafter, the color of the logo is assumed to be a white color.

For example, when the input image data IMG includes R as a first color data, G as a second color data and B as a third color data, the histogram extractor 211 may extract min(R, G, B). Herein, min( ) is a minimum function, R is a number of pixels represent red color in the logo area, G is a number of pixels represent green color in the logo area and B is a number of pixels represent blue color in the logo area. The white component of the logo of the input image data IMG may be extracted by extracting the min(R, G, B).

The logo detector 210 may further include a first histogram regenerator 213 and a second binarizer 214. The first histogram regenerator 213 may generate a second histogram based on the first histogram of the first logo area LOGO1. The second binarizer 214 may determine a second binarization level L2 to distinguish the second histogram into a second background area BG2 and a second logo area LOGO2. Herein, the second logo area LOGO2 may be an area including the logo. The second background area BG2 may be an area not including the logo. The second binarizer 214 may count a number of the pixels in the second logo area LOGO2 to determine a second logo pixel number PN2.

For example, the first histogram regenerator 213 may convert the value of the first background area BG1 of the first histogram into 0 to generate the second histogram.

When a background area near the logo area has a high luminance as shown in FIG. 8A, a portion of the background area which is not the logo may be perceived as the logo as shown in FIG. 8B after the first binarization operation. However, when the second binarization operation is performed to the first logo area LOGO1, some of the background areas from the first logo area LOGO1 may be recognized as the background area and removed from the second logo area LOGO2.

Hereinafter, the exemplary embodiment including only the first and second binarization operations is explained as an example.

In the exemplary embodiment which includes the first binarizer 212 and the second binarizer 214 to perform the binarization operation twice, the logo detector 210 may further include a logo map determiner 217 which selects one of the first histogram and the second histogram based on the first logo pixel number PN1 and the second logo pixel number PN2 to determine the first logo map MAP1.

The logo detector 210 may further include a threshold determiner 218 which accumulates a logo pixel number PN of the first logo map MAP1 to generate and provide a threshold pixel number TH to the logo map determiner 217.

The threshold determiner 218 may accumulate the logo pixel number PN of the first logo map MAP1 and may calculate an average of the accumulated logo pixel number PN to generate the threshold pixel number TH. A size of the logo displayed in the image may be constant in a short period of time, so that the accumulated logo pixel number PN may be used for an accurate logo determination. For example, the threshold determiner 218 may accumulate the logo pixel number PN during 128 frames.

When the first logo pixel number PN1 is less than the threshold pixel number TH, the logo map determiner 217 may determine the first logo map MAP1 based on the first histogram. In contrast, when the first logo pixel number PN1 is equal to or greater than the threshold pixel number TH, the logo map determiner 217 may determine the first logo map MAP1 based on the second histogram.

For example, when the threshold pixel number TH is 150 and the first logo pixel number PN1 after the first binarization operation is 140, the logo map determiner 217 may determine the first logo map MAP1 based on the first histogram.

For example, when the threshold pixel number TH is 150 and the first logo pixel number PN1 after the first binarization operation is 200, the additional binarization operation (the second binarization operation) may be performed. When the threshold pixel number TH is 150 and the second logo pixel number PN2 after the second binarization operation is 140, the logo map determiner 217 may determine the first logo map MAP1 based on the second histogram.

According to the present exemplary embodiment, the first binarization level L1 and the first logo pixel number PN1 may be determined based on the first histogram of the logo area and the second binarization level L2 and the second logo pixel number PN2 may be determined based on the second histogram generated based on the first binarization level L1 so that the accuracy of determination of the logo map MAP1 may be enhanced.

Hereinafter, the exemplary embodiment including the first, second and third binarization operations is explained. The number of the binarization operations may not be limited to two times or three times in the present inventive concept. The number of the binarization operations may be performed equal to or greater than four times.

In the exemplary embodiment operating the binarization operations in three times, the logo detector 210 may further include a second histogram regenerator 215 and a third binarizer 216. The second histogram regenerator 215 may generate a third histogram based on the second logo area LOGO2 of the second histogram. The third binarizer 216 may determine a third binarization level L3 to distinguish the third histogram into a third background area and a third logo area. The third binarizer 216 may count a number of the pixels in the third logo area to determine a third logo pixel number PN3.

For example, the second histogram regenerator 215 may convert the value of the second background area BG2 of the second histogram into 0 to generate the third histogram.

In the exemplary embodiment operating the binarization operations three times, the logo map determiner 217 may select one of the first histogram, the second histogram and the third histogram based on the first logo pixel number PN1, the second logo pixel number PN2 and the third logo pixel number PN3 to determine the first logo map MAP1.

When the first logo pixel number PN1 is less than the threshold pixel number TH, the logo map determiner 217 may determine the first logo map MAP1 based on the first histogram. When the first logo pixel number PN1 is equal to or greater than the threshold pixel number TH and the second logo pixel number PN2 is less than the threshold pixel number TH, the logo map determiner 217 may determine the first logo map MAP1 based on the second histogram. When the second logo pixel number PN2 is equal to or greater than the threshold pixel number TH, the logo map determiner 217 may determine the first logo map MAP1 based on the third histogram.

According to the present exemplary embodiment, the first binarization level L1 and the first logo pixel number PN1 may be determined based on the first histogram of the logo area, the second binarization level L2 and the second logo pixel number PN2 may be determined based on the second histogram generated based on the first binarization level L1 and the third logo pixel number PN3 may be determined based on the third histogram generated based on the second binarization level L2 so that the accuracy of determination of the logo map MAP1 may be enhanced.

In addition, an image in the logo area is compensated using the logo map so that the display quality of the display panel may be enhanced.

Figure 9:
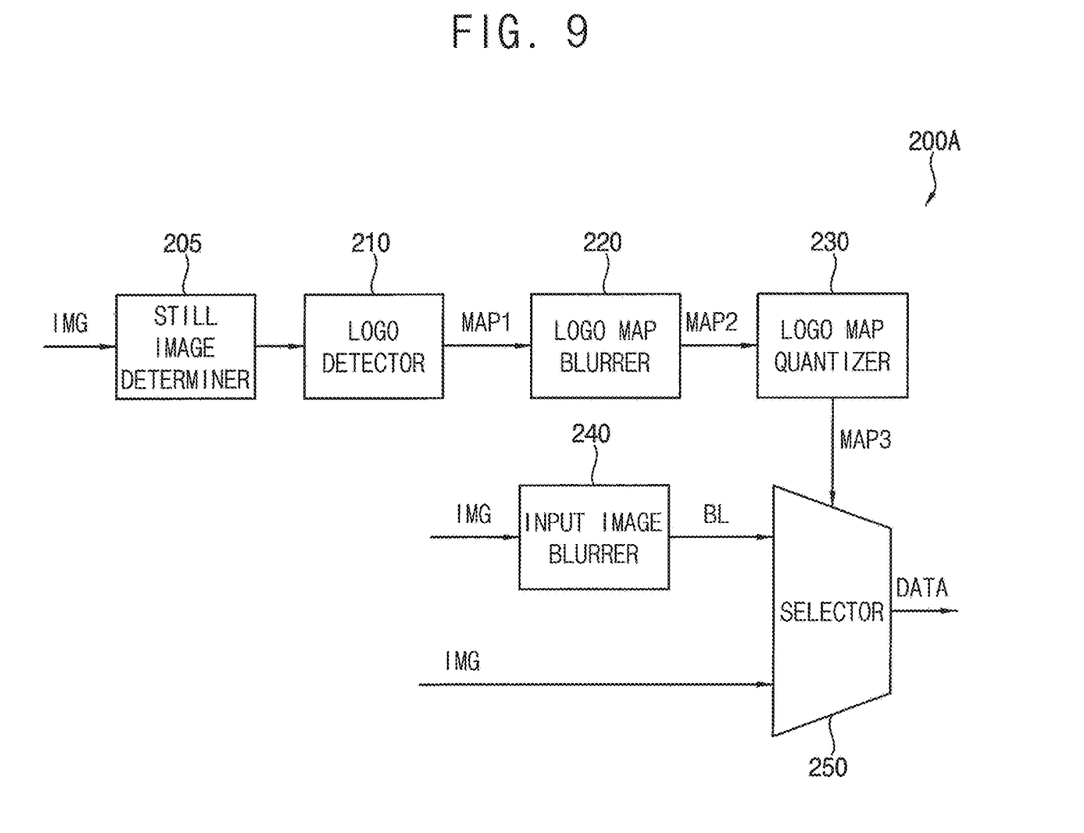
FIG. 9 is a block diagram illustrating a driving controller of a display apparatus according to an exemplary embodiment of the present inventive concept.

FIG. 9 is a block diagram illustrating a driving controller of a display apparatus according to an exemplary embodiment of the present inventive concept.

The driving controller, the display apparatus and the method of driving the display panel according to the present exemplary embodiment is substantially the same as the driving controller, the display apparatus and the method of driving the display panel of the previous exemplary embodiment explained referring to FIGS. 1 to 8C except for the structure and the operation of the driving controller. Thus, the same reference numerals will be used to refer to the same or like parts as those described in the previous exemplary embodiment of FIGS. 1 to 8C and any repetitive explanation concerning the above elements will be omitted.

Referring to FIGS. 1 and 3 to 9, the display apparatus includes a display panel 100 and a display panel driver. The display panel driver includes a driving controller 200A, a gate driver 300, a gamma reference voltage generator 400 and a data driver 500.

The driving controller 200A may detect logo area data of the input image data IMG corresponding to the logo and compensate the logo area data.

For example, the driving controller 200A may include a logo detector 210, a logo map blurrer 220, a logo map quantizer 230, an input image blurrer 240 and a selector 250. In the present exemplary embodiment, the driving controller 200A may further include a still image determiner 205.

The still image determiner 205 may determine whether the input image data IMG represent a still image or a motion picture image. The still image determiner 205 may compare previous frame data and present frame data to determine whether the input image data IMG represent the still image or the motion picture image. The still image determiner 205 may generate a flag representing whether the input image data IMG represent the still image or the motion picture image and may output the flag to the logo detector 210.

The logo detector 210 may include a threshold determiner 218 accumulating a logo pixel number PN of the first logo map MAP1 to generate a threshold pixel number TH.

The threshold determiner 218 may accumulate the logo pixel number PN of the first logo map MAP1 and may calculate an average of the accumulated logo pixel number PN to generate the threshold pixel number TH. A size of the logo displayed in the image may be constant in a short period of time, so that the accumulated logo pixel number PN may be used for an accurate logo determination. For example, the threshold determiner 218 may accumulate the logo pixel number PN during 128 frames.

In the present exemplary embodiment, the threshold determiner 218 may not accumulate the logo pixel number PN of the first logo map MAP1 when the input image data IMG represent the still image. When the input image data IMG represent the still image, the logo pixel number PN may be fixed. When the threshold determiner 218 accumulate the fixed logo pixel number PN, the accuracy of the logo determination using an average of the accumulated logo pixel number PN may be decreased.

In the exemplary embodiment operating the binarization operations twice, when the first logo pixel number PN1 is less than the threshold pixel number TH, the logo map determiner 217 may determine the first logo map MAP1 based on the first histogram. In contrast, when the first logo pixel number PN1 is equal to or greater than the threshold pixel number TH, the logo map determiner 217 may determine the first logo map MAP1 based on the second histogram.

In the exemplary embodiment operating the binarization operations three times, when the first logo pixel number PN1 is less than the threshold pixel number TH, the logo map determiner 217 may determine the first logo map MAP1 based on the first histogram. When the first logo pixel number PN1 is equal to or greater than the threshold pixel number TH and the second logo pixel number PN2 is less than the threshold pixel number TH, the logo map determiner 217 may determine the first logo map MAP1 based on the second histogram. When the second logo pixel number PN2 is equal to or greater than the threshold pixel number TH, the logo map determiner 217 may determine the first logo map MAP1 based on the third histogram.

According to the present exemplary embodiment, the first binarization level L1 and the first logo pixel number PN1 may be determined based on the first histogram of the logo area, the second binarization level L2 and the second logo pixel number PN2 may be determined based on the second histogram generated based on the first binarization level L1 and the third logo pixel number PN3 may be determined based on the third histogram generated based on the second binarization level L2 so that the accuracy of determination of the logo map MAP1 may be enhanced.

In addition, an image in the logo area is compensated using the logo map so that the display quality of the display panel may be enhanced.

According to the present exemplary embodiment, the afterimage is compensated so that the display quality of the display panel may be enhanced.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A driving controller including a logo detector, the logo detector comprising:
   a histogram extractor which receives input image data and is configured to extract a first histogram from logo area data of the input image data,
   a first histogram regenerator electrically connected to the histogram extractor and configured to receive the first histogram from the histogram extractor to generate a second histogram based on the first histogram, and
   a logo map determiner electrically connected to the histogram extractor and the first histogram regenerator, and configured to select one of the first histogram and the second histogram to generate a first logo map based on a number of pixels in a first logo area of the first histogram,
wherein the driving controller is configured to compensate the logo area data of the input image data using the first logo map.

2. The driving controller of claim 1, wherein the logo detector further comprises:
a first binarizer electrically connected between the histogram extractor and the logo map determiner to determine a first binarization level to distinguish the first histogram into a first background area and the first logo area, and configured to count the number of pixels in the first logo area to determine a first logo pixel number.

3. The driving controller of claim 2, wherein the histogram extractor is configured to extract an image corresponding to a color of a logo of the input image data.

4. The driving controller of claim 2, wherein, when the input image data include a component R as a first color, a component G as a second color and a component B as a third color, the histogram extractor is configured to extract min(R, G, B), wherein min( ) is a minimum function.

5. The driving controller of claim 2, wherein the logo detector further comprises:
a second binarizer electrically connected between the first histogram regenerator and the logo map determiner, configured to determine a second binarization level to distinguish the second histogram into a second background area and a second logo area and configured to count a number of pixels in the second logo area to determine a second logo pixel number.

6. The driving controller of claim 5, wherein the first histogram regenerator is configured to convert a value of the first background area of the first histogram into zero to generate the second histogram.

7. The driving controller of claim 5, wherein the logo map determiner selects one of the first histogram and the second histogram based on the first logo pixel number and the second logo pixel number to determine the first logo map.

8. The driving controller of claim 7, wherein the logo detector further comprises a threshold determiner connected to the logo map determiner and configured to accumulate a logo pixel number of the first logo map to generate a threshold pixel number.

9. The driving controller of claim 8, wherein the threshold determiner is configured to accumulate the logo pixel number of the first logo map and configured to calculate an average of the accumulated logo pixel number to generate the threshold pixel number.

10. The driving controller of claim 8, further comprising a still image determined connected to the logo detector and determining whether or not the input image data represent a still image,
wherein the threshold determiner is configured not to accumulate the logo pixel number of the first logo map when the input image data represent the still image.

11. The driving controller of claim 8, wherein, when the first logo pixel number is less than the threshold pixel number, the logo map determiner is configured to determine the first logo map based on the first histogram, and
wherein, when the first logo pixel number is equal to or greater than the threshold pixel number, the logo map determiner is configured to determine the first logo map based on the second histogram.

12. The driving controller of claim 5, wherein the logo detector further comprises:

a second histogram regenerator electrically connected to the first histogram regenerator to receive the second histogram and configured to generate a third histogram based on the second histogram of the second logo area; and
a third binarizer configured to determine a third binarization level to distinguish the third histogram into a third background area and a third logo area and configured to count a number of pixels in the third logo area to determine a third logo pixel number.

13. The driving controller of claim 12, wherein the second histogram regenerator is configured to convert a value of the second background area of the second histogram into zero to generate the third histogram.

14. The driving controller of claim 13, wherein the logo map determiner is configured to select one of the first histogram, the second histogram and the third histogram based on the first logo pixel number, the second logo pixel number and a third logo map pixel number to determine the first logo map.

15. The driving controller of claim 1, further comprising a logo map blurrer electrically connected to the logo detector to receive the first logo map and configured to blur the first logo map using an average filter to generate a second logo map.

16. The driving controller of claim 15, further comprising a logo map quantizer electrically connected to the logo map blurrer to receive the second logo map and configured to quantize the second logo map to generate a third logo map, and
wherein a logo portion in the third logo map is equal to or greater than a logo portion in the first logo map.

17. The driving controller of claim 16, further comprising an input image blurrer which receives input image data and is configured to blur the logo area data to generate blurred logo area data.

18. The driving controller of claim 17, further comprising a selector electrically connected to the input image blurrer and the logo map quantizer, and configured to output the logo area data when a value of the third logo map is zero and configured to output the blurred logo area data when the value of the third logo map is 1.

19. A display apparatus comprising:
a display panel configured to display an image based on input image data;
a data driver; and
a driving controller including a logo detector, the logo detector comprising:
a histogram extractor which receives the input image data and is configured to extract a first histogram from logo area data of the input image data,
a first histogram regenerator electrically connected to the histogram extractor and configured to receive the first histogram from the histogram extractor to generate a second histogram based on the first histogram, and
a logo map determiner electrically connected to the histogram extractor and the first histogram regenerator, and configured to select one of the first histogram and the second histogram to generate a first logo map based on a number of pixels in a first logo area of the first histogram,
wherein the driving controller is configured to compensate the logo area data of the input image data using the first logo map to generate a data signal; and wherein the data driver is configured to convert the data signal to a data voltage and configured to output the data voltage to the display panel.

20. A method of driving a display panel, the method comprising:
    extracting a first histogram from logo area data of input image data;
    generating a second histogram based on the first histogram;
    selecting one of the first histogram and the second histogram to generate a first logo map based on a number of pixels in a first logo area of the first histogram;
    compensating the logo area data of the input image data using the first logo map;
    generating a data signal based on the input image data having the compensated logo area data;
    converting the data signal to a data voltage; and
    outputting the data voltage to the display panel.

* * * * *